ADD-ON CIRCUIT FOR STEP-BY-STEP SYSTEMS

Filed Oct. 27, 1960 3 Sheets-Sheet 1

INVENTOR
J. C. ALBRECHT
BY John C Albrecht
ATTORNEY

ADD-ON CIRCUIT FOR STEP-BY-STEP SYSTEMS

Filed Oct. 27, 1960 3 Sheets-Sheet 2

INVENTOR
J. C. ALBRECHT
BY John C Albrecht
ATTORNEY

ADD-ON CIRCUIT FOR STEP-BY-STEP SYSTEMS

Filed Oct. 27, 1960 3 Sheets-Sheet 3

INVENTOR
J. C. ALBRECHT
BY John C Albrecht
ATTORNEY

United States Patent Office 3,144,517
Patented Aug. 11, 1964

3,144,517

ADD-ON CIRCUIT FOR STEP-BY-STEP SYSTEMS

John C. Albrecht, Chatham, N.J., assignor to Bell Telephone Laboratories, Incorporated, New York, N.Y., a corporation of New York Filed Oct. 27, 1960, Ser. No. 65,358
12 Claims. (Cl. 179—18)

This invention relates in general to telephone switching systems and more particularly to special customer services in such systems.

Telephone service is essential to the conduct of any business and in recent years there has been a trend to provide new and unusual customer services. Businesses which have a large number of employees concentrated in one or more locations often employ a private branch exchange (PBX) which is a small autonomous exchange. The PBX provides the necessary intracompany communication and also provides connections to telephone switching centers which serve the public in general. During the course of business, it is often desirable to connect three or more parties in a single conversation or to connect a recorder to a conversation which is established through a telephone switching system. Heretofore, there have been systems which permit the establishment of conference calls both under the control of an operator or under the control of a calling subscriber. However, in these arrangements, the calling party must predetermine that a conference call is desired. Often, however, while a calling and called party are in the course of conversation, it is determined that a third party should be added to the conversation. If a regular conference arrangement is to be employed, the parties must both hang up and the call must be re-established through a conference circuit. Although conference circuits find great utility, there are situations as noted above where the use of a conference circuit is overly burdensome to the subscribers. Further, during the course of a conversation, it is often desirable to place a recorder in circuit with the conversation to permit a portion of the conversation to be recorded for future transcription. It is impractical to provide a recorder for each subscriber station and it is desirable to be able to add a recorder to an existing conversation without requiring the talking parties to hang up and then re-establish the connection through a conference circuit including a recorder.

There are circuits known in the art which permit a called subscriber to transfer a call to another party served by the switching system. However, such arrangements are lacking in features which permit both the calling and called subscribers to: (1) add a party to a conversation; (2) dismiss the connection to the added line if the added party does not answer or if the line to be added is busy; and (3) permit the dismissal of the added party before the original conversation is abandoned.

It is an object of this invention to permit the establishment of conference calls under control of either the calling or the called subscribers who are connected through a telephone switching system.

It is another object of this invention to permit both the calling and called parties to add a recorder in circuit with an established connection through a telephone switching office.

It is another object of this invention to permit either the calling or the called subscriber to dismiss a conference connection if the party to be added fails to answer or if the line of the party to be added is found to be busy.

It is another object of this invention to permit either the calling or the called parties to a telephone connection through a telephone switching office to dismiss a connection to a party which has been added to the connection after the added connection is no longer required.

Advantageously, in accordance with this invention, an add-on appliqué circuit is available to both the calling and called subscriber after a talking connection has been established through the telephone switching system between these subscribers. If, during the course of such an established conversation, it is determined that a third party or a recorder is to be added to the connection, either the calling or called party may seize the add-on circuit by flashing the switchhook or by dialing a prefix digit. After the add-on circuit is seized, dial tone is returned and the calling or called party may proceed to dial the directory number of the party to be added to the conversation. If the line to be added fails to answer or is found to be busy, the add-on line circuit may be dismissed by again flashing the switchhook or by dialing a suffix digit. If the line added to the original conversation answers, ringing is tripped and the conversation may proceed between the original parties and the add-on subscriber. If the subscriber or recorder added to the conversation is no longer needed, the connection to the add-on subscriber may be dismissed by the calling or called subscriber by flashing the switchhook or dialing a suffix digit and the original connection remains operative.

If it is desired to place a recorder in circuit with an existing conversation, the connection is established in the manner outlined above for adding a third party. If there is an idle recorder, the recorder control circuit trips the ring and returns a distinctive tone to the parties connected through the switching system, thereby indicating that the message to be recorded may be initiated.

In accordance with one feature of this invention, calling or called parties who are connected for purposes of communication through a telephone switching office may seize an add-on circuit by flashing the station switchhook or by dialing a prefix seizure digit.

In accordance with another feature of this invention, the prefix seizure digit may be any digit in the system numbering plan.

In accordance with another feature of this invention, a party or a recorder may be added to an existing connection through a telephone switching office by dialing the directory number of the party or recorder to be added after the add-on circuitry has been seized.

In accordance with another feature of this invention, the add-on circuit may be dismissed if the line of the party to be added is found to be busy or if the subscriber fails to answer.

In accordance with another feature of this invention, an add-on connection may be dismissed after the connection is no longer required by flashing the switchhook or by dialing a suffix digit.

In accordance with another feature of this invention, the suffix release digit may be any digit in the system numbering plan.

In accordance with another feature of this invention, a timing circuit serves to dismiss the add-on appliqué circuit if add-on dialing is not completed within a predetermined time interval.

The above and other objects and features of this invention can best be understood with reference to the drawing in which.

Figure 1:
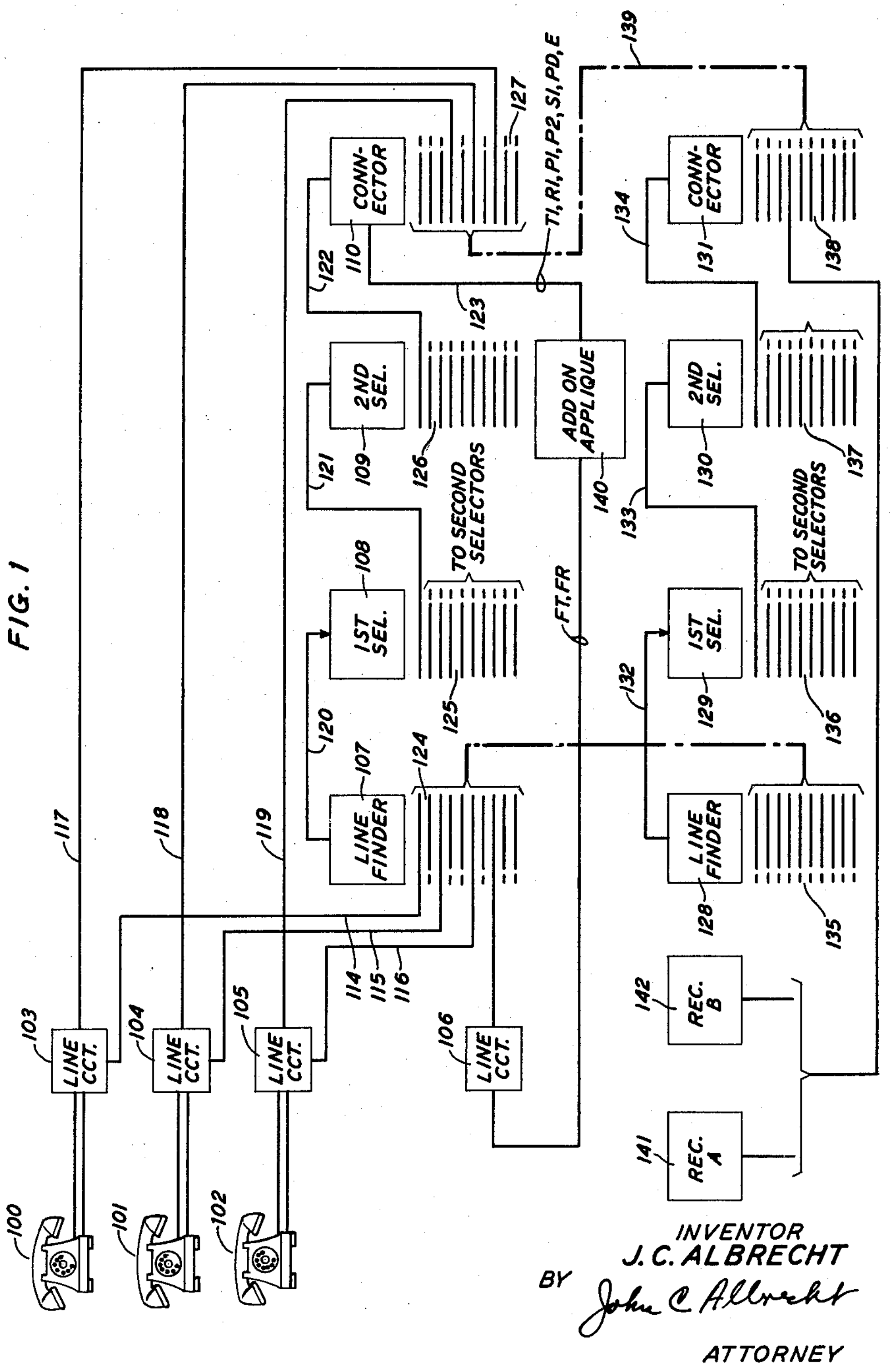
FIG. 1 is a block diagram of a telephone switching system in accordance with this invention.

In FIG. 1, there is shown a step-by-step telephone switching system serving a plurality of subscriber stations such as 100, 101, and 102. Associated with these subscriber stations are the line circuits such as 103, 104, and 105. These subscriber line circuits terminate at bank terminals of the line finder 107 and at bank terminals of the connector 110. When a call is originated from one of the subscriber stations 100, 101, or 102, the associated line circuit 103, 104, or 105 responds and the line finder 107 hunts until the control circuitry and the output terminals of the line finder become associated with the line requesting service. The banks of the line finder 107 and 128 are multipled, that is, the lines which appear at the bank terminals of the line finder 107 also appear at the banks of the line finder 128. A first selector switch is associated with each line finder switch. That is, the first selector 108 is associated with the line finder 107 and these switches are connected by the conductors in conductor group 120. Similarly, the first selector 129 is associated with the line finder 128 and these switches are connected by the conductor group 132.

After a line requesting service has seized a line finder such as 107 and has become associated with a first selector 108, dial tone is returned to the requesting subscriber station, thereby indicating that the subscriber may proceed to dial the directory number of the called line. The first and second selector switches such as 108 and 109 each respond to one digit of a called directory number and the connector switch 110 responds to the final two digits of the called directory number. After the first and second selectors and the connector have been connected to associate the calling line with the called line, ringing tone is connected to the called subscriber's line and ringing induction tone is connected to the calling subscriber's line. If the called line is busy, busy tone is returned to the calling subscriber's line and the called subscriber's line is not affected.

If the called line was not busy and the called party answers, a transmission path will be established between the calling and called parties and ringing will be halted or tripped.

The add-on appliqué circuit 140 is arranged to accept signaling information originating with either the calling or called subscriber. The process of adding a third subscriber or a recorder to the connection established through the switching train will first be described in a general way and then the detailed operation of the connector switch 110 and the add-on appliqué circuit 140 will be described.

Whether the calling or called party is to undertake the steps to add on a third party or a recorder, the process employed is the same. The party wishing to add the third party or recorder flashes the switchhook of his station or dials a prefix seizure digit. This seizure digit may be any digit in the numbering plan as the appliqué circuit merely recognizes that a digit has been dialed and does not rely upon information as to the numerical value of this digit. Seizure of the add-on appliqué circuit 140 completes a loop to the add-on line circuit 106. The line circuit 106 is employed only for the purpose of originating calls and therefore does not require a connection to bank terminals of a connector such as 110. The line circuit 106 is like the line circuits 103, 104, and 105 in that it responds to a loop seizure over the FT and FR conductors. When the line circuit 106 is seized, the line finder such as 128 hunts to associate the line finder control circuitry and output terminals with the line circuit 106. After the line finder such as 128 and the associated first selector such as 129 are associated with the line circuit 106, dial tone is returned from the first selector 129 through the line finder 128, the line circuit 106, and the add-on appliqué circuit 140 to the connection which is established through the connector 110. The calling or called party then proceeds to dial the directory number associated with the party to be added or with the recorder. The switch train comprising the first and second selectors such as 129 and 130 and the connector such as 131 responds to this dial signaling information in the same manner that the switches responded in establishing the original call between the calling and called party. Upon completion of dialing, the connector switch such as 131 is connected to the line or recorder which is to be added to the original connection.

The connector determines the supervisory state of the line to be added and if the line is busy a distinctive busy tone is returned to the original connection. After busy tone is returned, the calling or called subscriber may flash the station switchhook or dial a suffix release digit to releases the add-on appliqué circuit 140. As in the case of the prefix seizure digit, the suffix release digit may be any digit in the numbering plan as the add-on circuit recognizes that a digit has been dialed and does not concern itself with the numerical value of the digit that has been dialed.

Figure 2:
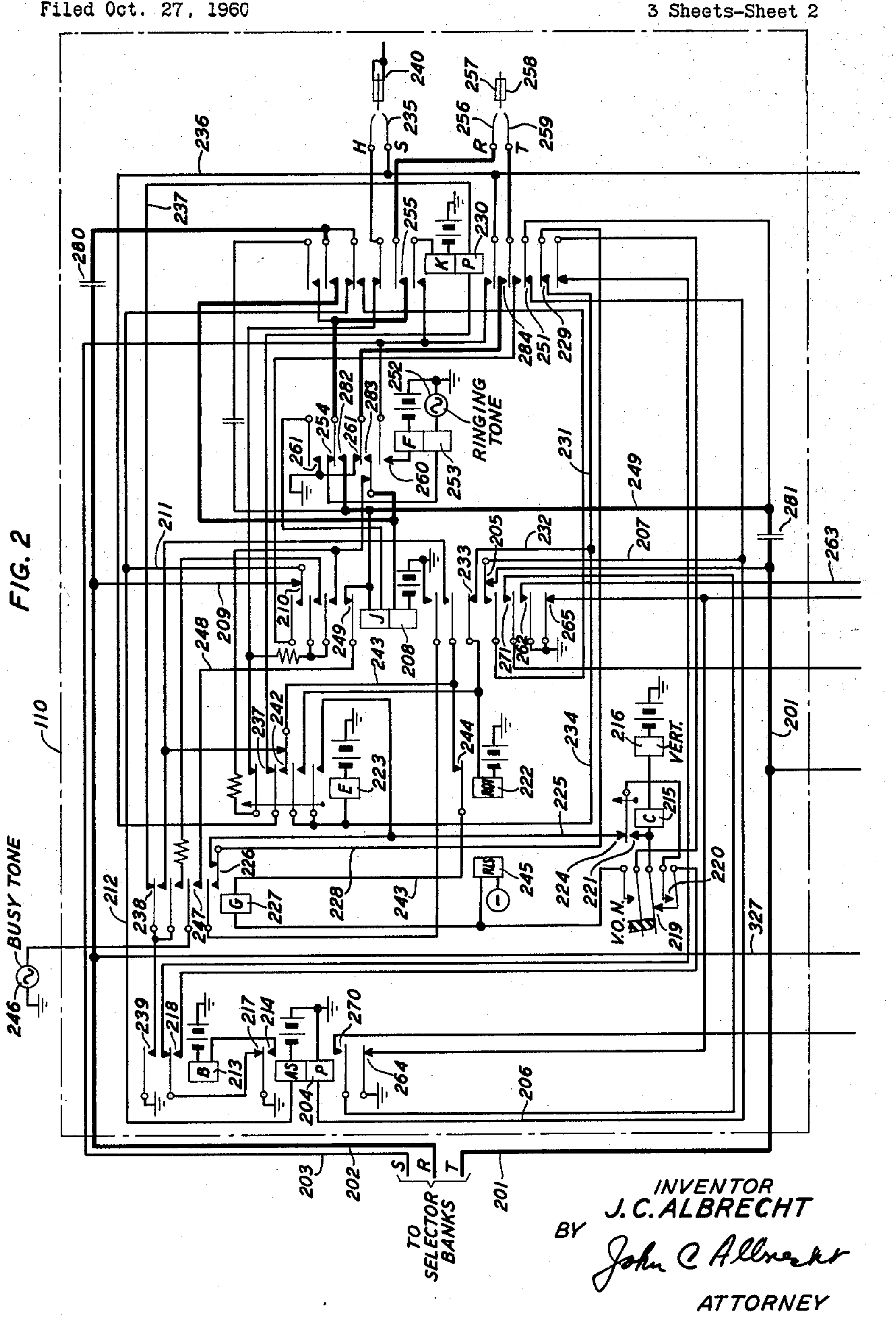
FIG. 2 is a schematic diagram of a connector switch as employed in FIG. 1.
Figure 3:
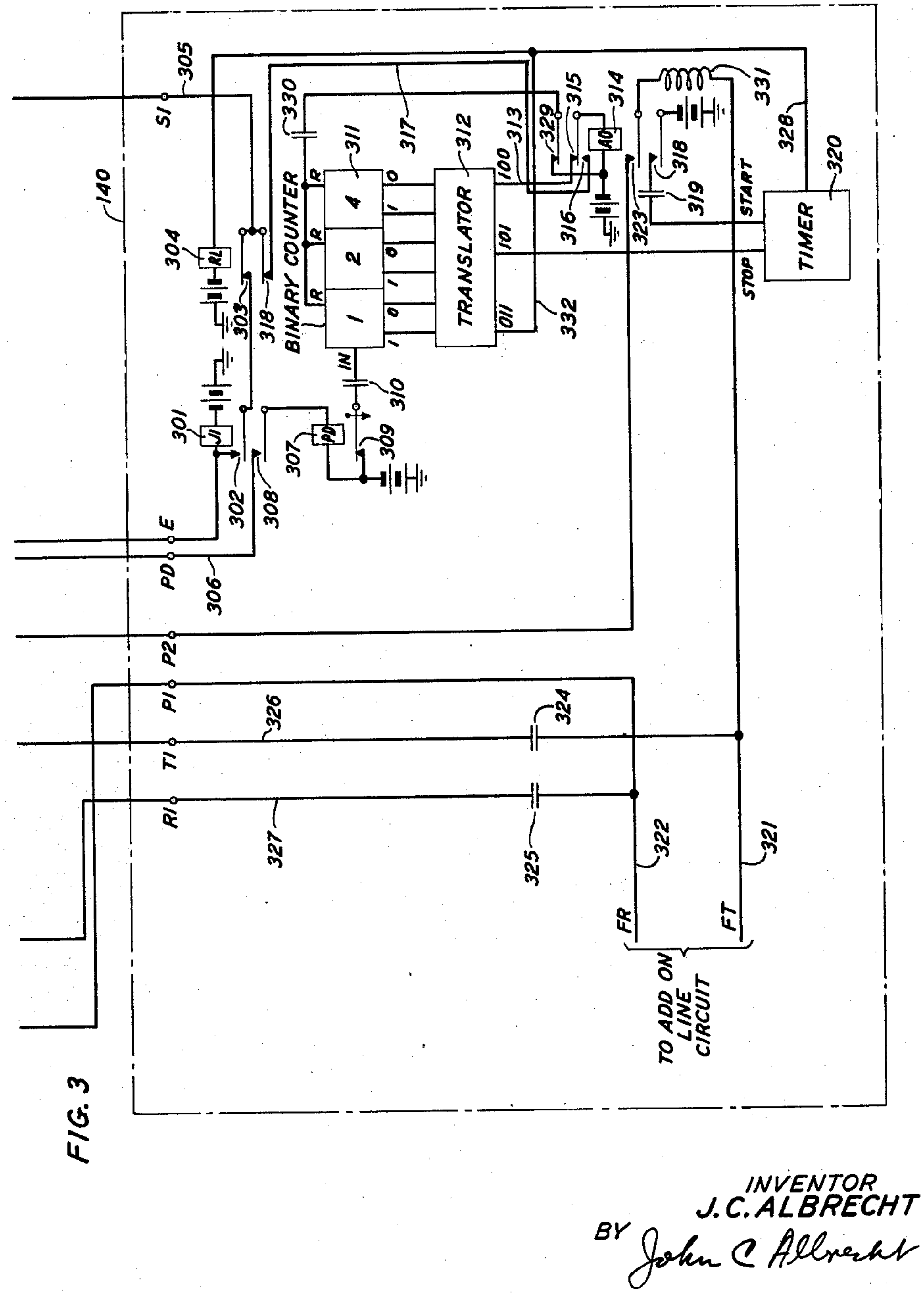
FIG. 3 is a schematic diagram of an add-on appliqué circuit in accordance with this invention.

If the line to be added is idle, the connector switch proceeds to connect ringing current to the line of the party to be added and ringing induction back to the connector switch associated with the original connection. If the party to be added answers, ringing will be tripped and communication may proceed between the parties to the call. The parties to the original conversation may wish to continue their conversation beyond the time that the party added is required, in which case the calling or called party flashes the station switchhook or dials a suffix release digit to release the connection to the party which was added. If the connection between the calling and called parties is to be released at the same time as the connection to the party which was added to the circuit, then the calling and called parties may hang up and all switches will be released. In that a conversation is established through the switching system of FIG. 1 in a manner well known to the art, only the details relating to the operation of the connector switch such as 110 and the add-on appliqué circuit such as 140 will be described at this time with reference to FIGS. 2 and 3. The connector switch 110 in this one illustrative embodiment is a rotary-hunting PBX step-by-step connector switch. The tip, ring and sleeve conductors 201, 202, and 203 are connected to the bank terminals of the second selector 109. The connector switch 110 is seized when a loop is completed over the tip and ring conductors 201 and 202. When the connector 110 is seized, the A relay 204 operates over a path which includes ground potential, the primary winding of the A relay 204, conductor 206, conductor 207, break contact 205 of the J relay 208, the tip conductor 201, the loop closure from the subscriber's station through the line finder and the first and second selectors, the ring conductor 202, conductor 209, the break contact 210 of the J relay 208, conductor 211, conductor 212, and the secondary winding of the A relay 204 through battery to ground. Operation of the A relay 204 in turn causes the B relay 213 to operate over a path which includes ground potential through make contact 214 of the A relay 204 and the winding of the B relay 213 through battery to ground. The B relay 213 is a slow release relay which will remain operated if the A relay is pulsed at a normal dialing rate. However, the B relay will release if the A relay remains released for more than a normal dial inter-pulse period.

After the connector switch is seized, the calling party may proceed to dial the last two digits of the directory number of the called line. The A relay 204 is in direct circuit with the dial pulse contacts of the subscriber stations such as 100, 101, 102, and follows the dial pulse transitions from the calling line. Upon release of the A relay 204 in response to the first dial transition from the calling subscriber's line, the C relay 215 operates in series with the vertical magnet 216 over a path which includes ground potential, the break contact 217 of the A relay 204, the make contact 218 of the B relay 213, the break contact 219 of the vertical off normal springs, the winding of the C relay 215 and the winding of the vertical magnet 16 through battery to ground.

The vertical magnet 216 causes the switch wipers to be moved one step vertically each time the A relay releases during the first digit dialed after the connector is seized. After the connector switch wipers have been moved off normal, the operating path for the vertical magnet and the C relay is transferred to a path which includes ground potential, the break contact 217 of the A relay 204, the make contact 218 of the B relay 213, the make contact 220 of the vertical off normal springs, the make contact 221 of the C relay 215, the winding of the C relay 215, the winding of the vertical magnet 216 through battery to ground. The C relay 215, like the B relay 213, is a slow release relay which holds up during normal inter-pulse periods but releases during inter-digital periods. The vertical magnet causes the vertical pawl to follow the dial pulse transitions of the first connector digit from the calling subscriber station. After receipt of that digit the C relay releases, thereby destroying the operating path for the vertical magnet 216 and preparing an operating path for operation of the E relay 221 in parallel with rotary magnet 222. Each time the rotary magnet is energized, the connector switch wipers are moved horizontally across the banks of the connector switch at the level dictated by the dial pulses which activated the vertical magnet 216. The operate path for the E relay and the rotary magnet includes ground potential, the break contact 217 of the A relay 204, the make contact 218 of the B relay 213, the make contact 220 of the vertical off-normal contacts, the break contact 224 of the C relay 215, conductor 225, the break contact 226 of the G relay 227, conductor 228, the break contact 229 of the K relay 230, conductor 231, conductor 232, the break contact 233 and the winding of the rotary magnet 222 through battery to ground in parallel with a path which includes conductor 234 and the winding of the E relay 223 through battery to ground. The E relay is a slow release relay and, like the B and C relays, remains operated even though it is de-energized for normal inter-pulse periods. Immediately after the second connector digit has been dialed and the connector wipers have been moved vertically and horizontally to the position assigned to the called directory number, the connector switch either returns busy tone to the calling subscriber or connects ringing tone to the called subscriber's line in accordance with the supervisory state of the called line. As previously noted, the E relay 223 is a slow release relay and holds up momentarily after the selected bank position has been reached. If the called line is busy, ground potential will appear at the sleeve terminal 240 of the called line. If the called line is busy, the G relay 227 will operate over a path which includes ground potential, sleeve terminal 240, sleeve wiper 235, conductor 236, make contact 242 of the E relay 223, conductor 243, break contact 244 of the rotary magnet 222, conductor 245, the winding of the G relay 227 in series with the release magnet 245 to a negative potential source. The resistance of the G relay 227 and the operating requirements of the release magnet 245 are such that the release magnet is not energized at this time; however, the G relay does operate. Operation of the G relay connects the busy tone source 246 through the make contact 247 of the G relay 227, conductor 248, break contact 249 of the J relay 208, conductor 279, the tip conductor 201 back to the calling subscriber via the second and first selectors 109 and 108 and the line finder 107.

If the called line is not busy, battery rather than ground will be present at the sleeve terminal 240, the G relay will not operate, and the E relay will release after its normal slow release holding period. An operating path is thus prepared for the primary winding of the K relay 230. This path includes ground potential, make contact 239 of the A relay 204, the break contact 238 of the G relay 227, conductor 237, the primary winding of the K relay 230, the break contact 237 of the E relay 223, conductor 236, sleeve wiper 235, the sleeve bank terminal 240 to the negative potential source in the line circuit of the called subscriber's line. Operation of the K relay connects the ringing tone source 252 to the called subscriber's line. Ringing tone is applied over a path which includes ground potential, the ringing tone source 252, the winding of the F relay 253, the break contact 254 of the F relay 253, the make contact 255 of the K relay 230, the ring wiper 256, the ring back terminal 257 associated with the called subscriber's line, the called subscriber's line station apparatus, the tip bank terminal 258 of the called subscriber's line, the tip wiper 259, make contact 284 of the K relay 230, break contact 261 of F relay 253 to ground potential. Ringing current is thereby applied to the subscriber's line in series with the operate winding of the F relay 253. Ringing induction is returned at the same time over the tip conductor to the calling subscriber.

When the called subscriber answers, an operate path for the F relay 253 is provided. Operation of the F relay 253 opens the contacts 254 and 261 of the F relay 253, thereby removing ringing tone from the called subscriber's line and removing ringing induction from the calling subscriber's line. The F relay locks up through its own make contacts 260 to the sleeve conductor 203 from the preceding selector switch.

When the F relay 253 and the K relay 230 are held simultaneously operated, the windings of the J relay 208 and a source of transmission battery are connected to the called subscriber's line. That is, there is a path from ground potential through the make contact 261 of the F relay 253, the upper winding of the J relay 208, the make contact 282 of the F relay 253, the make contact 255 of the K relay 230, the ring wiper 256, the ring terminal 257 of the connector bank, the called subscriber's station loop, the tip terminal 258 of the connector bank, the tip wiper 259, make contact 269 of the K relay 230, make contact 283 of the F relay 253, the lower winding of the J relay 208 through the potential source to ground. A transmission battery bridge is thereby provided to the called subscriber's line and the windings of the J relay 208 are in direct series with the called subscriber's station apparatus. At this point, the calling subscriber's line and its associated station apparatus are similarly in series with windings of the A relay 204. Operation of the J relay 208 reverses the connection between the tip and ring conductors 201 and 202 and the windings of the A relay 204. This reverses the polarity of transmission battery connected to the calling subscriber's line and the reversal of battery is employed for purposes of charging which are unimportant to the present discussion. A transmission path is completed between the calling and called subscriber by the capacitors 280 and 281.

If, after the called party has answered and the above-described transmission bridges and transmission path have been completed, the calling or called subscriber further manipulates the dial associated with his station, the add-on appliqué circuit 140 will be seized. The A relay 204 follows dial transitions from the calling subscriber and the J relay 208 follows dial transitions from the called subscriber. Operation of the J relay 208 completes a path from ground through the make contact 262 of the J relay 208, conductor 263, and the winding of the J1 relay 301 through battery to ground to operate the J1 relay 301. The J1 relay locks to the potential on the sleeve terminal 240 over a holding path which includes make contact 302 of the J1 relay 301, break contact 303 of the RL relay 304, conductor 305, the sleeve wiper 235, and the sleeve terminal 240. The add-on appliqué circuit is thereby enabled and is prepared to operate in response to subsequent dial signaling information from either the calling or called subscriber station. In that the A relay 204 and the J relay 208 follow the dial pulse transitions from the calling and called stations, respectively, ground potential will be applied to the pulse detection conductor 306 whenever the calling or called subscriber dials subsequent to the enablement of the appliqué circuit 140. If the dial signaling is from the calling subscriber, ground is applied to conductor 306 via the break contact terminal 264 of the A relay 204 and if the dial signaling information is from the called subscriber, ground will be applied to the pulse detection conductor 306 through the break contact terminal 265 of the J relay 208. When ground is applied to the pulse detection conductor 306, the pulse detection relay 307 operates through a path which includes the make contact 308 of the J1 relay 301. The pulse detection relay 307 is a slow release relay which holds up during normal inter-pulse periods but releases during an inter-digital period. After the first digit is dialed and it should be noted that it is unimportant exactly what number is dialed, the pulse detection relay only recognizes that at least one dial pulse transition has occurred at the calling or called subscriber station. Consequently, the add-on appliqué circuit 140 may be seized by flashing the switchhook of the calling or called station or by dialing any digit in the numbering plan of the switching system. When the pulse detection relay 307 releases, battery is applied through the break contact 309 and capacitor 310 to the input terminal of the binary counter 311. The binary counter 311 is thus incremented by a count of one.

In this one illustrative embodiment, the binary counter 311 serves to count the number of digits which have been dialed and the translator 312 provides appropriate output signals after predetermined numbers of digits have been dialed. The combination of the binary counter 311 and the translator 312 is well understood in the art and it is sufficient to note that the stage labelled "1" in the binary counter 311 is the least significant bit of the binary number. The stage labeled "2" is the next significant bit and the stage labeled "4" the following significant bit. The output terminals of the translator 312 are labeled to signify the binary count in the binary counter 311 when the respective translator output conductors are enabled. At the time the add-on appliqué circuit 140 is seized, the binary counter 311 is in the 000 state; therefore, after the seizure digit has been received, the binary counter 311 will be advanced to the 100 state. Accordingly, the 100 output conductor 313 of the translator 312 will be enabled and the add-on relay 314 will be operated over a path which includes the break contact 315 of the add-on relay 314. The add-on relay 314 will lock to a holding path which includes the make contact 316 of the add-on relay 314, conductor 317, the back contact 318 of the RL relay 304, the S1 conductor 305, the sleeve wiper 235 of the connector, and the sleeve terminal 240 associated with the called subscriber's line.

The make contact 316 and the break contact 315 of the add-on relay 314 are a make-before-break contact set. That is, the make contact 316 closes before the break contact 318 opens; therefore, the holding path for the add-on relay 314 is established before the operating path is broken.

Operation of the add-on relay provides a pulse through the make contact 318 of the add-on relay 314 and capacitor 319 to start the timer 320. The timer 320 serves the release the add-on circuit if dialing to connect the line to be added has not been completed within a predetermined time interval.

Operation of the add-on relay 314 also closes a loop over the FT and FR conductors 321 and 322 through the make contact 323 of the add-on relay 314, make contact 270 of the A relay 204, and make contact 271 of the J relay 208. The add-on line circuit 106 is thereby seized and a line finder such as 128 hunts until the line finder and the associated first selector 129 become connected to the line circuit 106. After this connection is established, dial tone is returned from the first selector such as 129 through the FT and FR conductors 321 and 322, capacitors 324 and 325, T1 and R1 conductors 326 and 327 to the tip and ring conductors 201 and 202, and by way of capacitors 280 and 281 to the tip and ring wipers 256 and 259 of the connector switch 110. Dial tone is thus returned to both the calling and called subscriber stations and dialing to add on a third subscriber or a recorder may proceed. The make contact 270 of the A relay 204 and the make contact 271 of the J relay 208 are in series with the fundamental tip and ring conductors 321 and 322 which go forward through the line circuit 106 to the line finder such as 128 and the first selector such as 129. Accordingly, the first selector such as 129 and the subsequent switches in the train such as 130 and 131 will follow subsequent dial pulse transitions from the calling or called subscriber as the A relay 204 follows the dial pulse transitions from the calling subscriber and the J relay 208 follows the dial pulse transitions from the called subscriber.

Each time the A relay 204 or the J relay 208 releases in response to a dial signal, the PD relay 309 will be energized and after the digit has been completed, the PD relay 307 will release, thereby incrementing the count in the binary counter 311 by one. In this one illustrative example, it is assumed that a four-digit directory number is employed; therefore, the timer 320 may be disabled after the seizure digit and four directory number digits have been dialed. Accordingly, the timer 320 is disabled when the 101 output conductor of the translator 312 is enabled. Enablement of the 101 output conductor signifies that the binary counter 311 has reached the count of five. If the directory number contains other than four digits, a different translator output conductor is employed to disable the timer 320.

If a called or calling party dials an add-on seizure digit plus a number of digits which are less in number than the directory number employed in the switching system, the timer 320 will time out and its output conductor 328 will be energized to operate the RL release relay 304. Operation of the RL relay 304 opens break contact 303 to open the holding path for the J1 relay 301 and also opens the break contact 318, thereby breaking the holding path for the AO add-on relay 314. Release of the add-on relay 314 removes the loop to the add-on line circuit 106, thereby releasing the add-on line circuit and any switches connected thereto. In addition, release of the add-on relay 314 also completes a path from battery through the break contact 329 of the add-on relay 314 and through capacitor 330 to the reset terminals of all three stages of the binary counter 311. Release of the add-on relay thereby prepares the binary counter 311 for subsequent seizure by the calling or called subscriber.

If the calling or called subscriber completes the necessary number of digits to add a subscriber or a recorder, the binary counter 311 will reach the appropriate state to disable the timer 320 and the connection to the subscriber to be added or to the recorder will proceed without interruption. If the line of the added subscriber is not busy, ringing tone will be applied to that line and if subsequently the added station answers, a transmission path will be established from the added subscriber to the calling and called subscribers of the original connection via the FT and FR conductors 321 and 322, capacitors 324 and 325, and conductors 326 and 327. It should be noted that the loop which includes the make contact 323 of the add-on relay 314 and the make contacts 270 of the A relay 204 and 271 of the J relay 208 includes the coil 331. This coil provides a D.-C. pulsing path; however, its impedance is chosen to provide a negligible bridging loss across the fundamental tip and ring conductors 321 and 322.

After a connection has been established by means of the add-on appliqué circuit 140, that connection may be released: (1) by either the calling or called party dialing a suffix release digit; (2) by the calling or called party flashing the switchhook; or (3) by the calling and called subscribers hanging up and thereby releasing the original connection.

If the calling or called subscriber either flashes the switchhook associated with his station or dials a suffix release digit, the pulse detection relay 307 will respond and upon completion of the hook switch flash or the suffix digit, the PD relay 307 will release and increment the binary counter 311 one count past that which was employed to disable the timer 320. In the example, when the count in the binary counter 311 reaches 011 or a count of six, conductor 332 will be energized and the RL release relay 304 will be operated. Release of the add-on circuit proceeds as previously described.

If the calling and called subscribers to the original connection hang up, the connector switch such as 110 will release, thereby removing ground from the sleeve wiper 235. This causes release of the J1 relay 301 and the add-on relay 314 which were held operated over conductor 305, sleeve wiper 235, and sleeve terminal 240.

The recorders 141 and 142, which are shown in FIG. 1, are connected to the bank terminals of a connector such as 110 or 131 and are assigned regular directory numbers within the switching system numbering plan. The recorders are assigned bank positions in a rotary hunting connector group; therefore, if the first recorder is busy, the connector such as 110 or 131 will automatically hunt until an idle recorder is found. If traffic conditions are such that an idle connector does not exist, busy tone will be returned to the parties to the original connection. The recorder such as 141 or 142 is arranged to trip the ring and immediately thereafter return a distinctive tone to the calling and called parties to the original connection, thereby indicating that the message to be recorded may proceed.

It is to be understood that the above-described arrangements are but illustrative of the application of the principles of the invention. Numerous other arrangements may be devised by those skilled in the art without departing from the spirit and scope of the invention.

For example, the combination of the binary counter 311 and the translator 312 may be replaced by a ring counting circuit in which only one stage is active at any given time and the counter is advanced each time the pulse detection relay 307 releases. In this case, output terminals of particular ones of the ring counter stages are employed in the same manner as the output conductors of the translator 312. Further, a relay chain which is advanced through its various states upon release of the pulse detection relay 307 can also be employed.

What is claimed is:

1. In a telephone switching system, a plurality of subscriber stations, a telephone switching network, means at each of said subscriber stations for generating call signal information representative of a called subscriber station, control means responsive to said call signal information from a calling one of said subscriber stations for selectively controlling said switching network to prepare a transmission path to connect said calling station with said called station, cut-through means responsive to a signal from said called station for completing said prepared transmission path through said switching network between said calling station and said called station, add-on means enabled by said cut-through means, said add-on means including switching means responsive when enabled to further call signal information from said calling station or said called subscriber station for selectively controlling said switching network to prepare a transmission path to connect said calling and called stations with another one of said plurality of subscriber stations.

2. A telephone switching system in accordance with claim 1 wherein said add-on means comprises means responsive to call signal information from said calling station or said called subscriber station for generating an output signal after each digit of said further call signal information, register means responsive to said output signal for maintaining a record of the number of further digits dialed, relay means responsive to a first output signal from said register means for seizing said switching means, and means responsive to a second output signal from said register means for releasing said switching means and said add-on means.

3. A telephone switching system in accordance with claim 2 further comprising timer means enabled by said relay means for generating an output signal after a predetermined time-out cycle, said time-out means responsive to a third output signal from said register means for disabling said timing means.

4. A telephone switching system in accordance with claim 3 wherein said release means is responsive to said output signal from said timing means.

5. A telephone switching system in accordance with claim 1 wherein said switching means are capacitively connected to said calling and said called subscriber stations.

6. A telephone switching system comprising a plurality of subscriber stations, a step-by-step switching network for establishing a connection between a calling one of said subscriber stations and a called one of said subscriber stations including a plurality of line finders, a plurality of associated first selectors, a plurality of intermediate selectors, a plurality of connectors, a plurality of add-on appliqué circuits associated with said connectors and responsive to call signaling information from said calling or said called subscriber stations for selectively preparing a transmission path to connect a third one of said plurality of subscriber stations with a calling subscriber station and a called subscriber station interconnected through said network.

7. A telephone switching system in accordance with claim 6 wherein said appliqué circuit comprises counting means responsive to call signaling information from said calling or said called subscriber station for generating output signals after discrete numbers of call signaling digits have been originated by said calling or said called subscriber station, means responsive to a first discrete output signal from said counting means for seizing a line finder and associated first selector in said step-by-step switching system, timing means responsive to said last-named means for generating a time-out signal after a predetermined time interval, said timing means responsive to a second discrete output signal from said counting means for terminating said timing function, and release means responsive to a third discrete output signal from said counting means for releasing said line finder and said associated first selector.

8. In a telephone switching system a plurality of dial subscriber stations, a switching network for selectively establishing a connection between a calling one and a called one of said subscriber stations, a plurality of subscriber line circuits associated with said subscriber stations and connected to said switching network, a plurality of add-on line circuits connected to said switching network, and control means connected to said switching network and enabled when a connection is established between a calling one and a called one of said subscriber stations, said control means responsive to dial signals from said calling station or said called subscriber station connected through said switching network, said control means operative to seize one of said add-on line circuits and to establish a connection through said switching network between said calling and said called subscriber stations and another of said subscriber dial stations.

9. A telephone switching system in accordance with claim 8 wherein said control means comprises first relay means in series with said calling dial subscriber station, second relay means in series with said called subscriber station, third relay means for seizing said add-on line circuit, and register means responsive to said first and said second relay means for maintaining a record of the number of digits dialed after said connection is established through said switching network, said third relay means responsive to a first discrete output signal from said register means.

10. A telephone switching system in accordance with claim 9 wherein said control means further comprises timing means for providing a release output signal after a predetermined time-out interval, said timing means responsive to a start timing signal from said relay means and responsive to a stop timing signal from said register means.

11. A telephone switching system in accordance with claim 9 wherein said control means further comprises release relay means for releasing said control circuit, said release relay means responsive to a release signal from said register means.

12. A telephone switching system comprising a plurality of dial subscriber stations, a plurality of voice recorders, a step-by-step switching network for establishing a connection between a calling one of said subscriber stations and a called one of said subscriber stations including a plurality of line finders, a plurality of associated first selectors, a plurality of intermediate selectors, a plurality of rotary hunting connectors, a plurality of add-on appliqué circuits enabled by and connected to said connectors for selectively connecting an idle one of said recorders with a calling subscriber station and a called subscriber station interconnected through said connector in response to dial signals from said calling or said called subscriber stations.

References Cited in the file of this patent

UNITED STATES PATENTS

| | | |
|---|---|---|
| 1,221,166 | Goodrum | Apr. 3, 1917 |
| 1,221,773 | Sperry | Apr. 3, 1917 |
| 2,185,287 | Beaumont | Jan. 2, 1940 |